April 25, 1950 M. F. JACKSON 2,505,120
VIBRATION DAMPING DEVICE
Filed Jan. 15, 1945
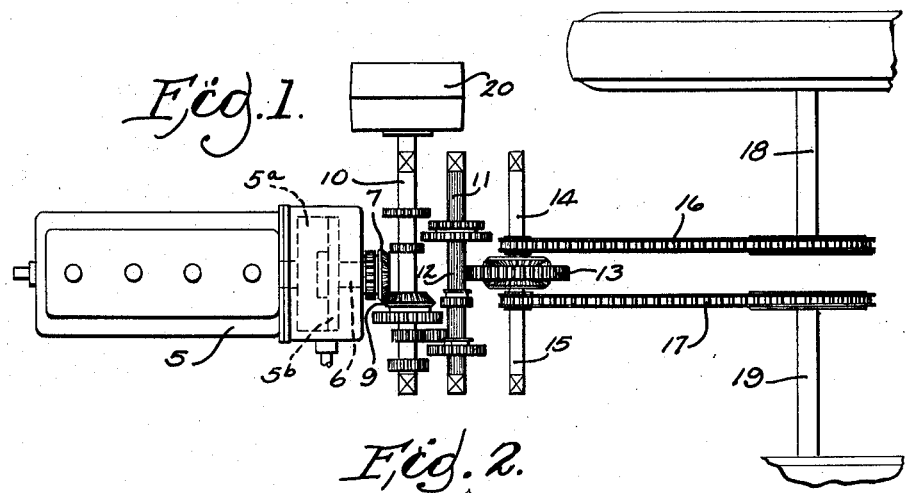
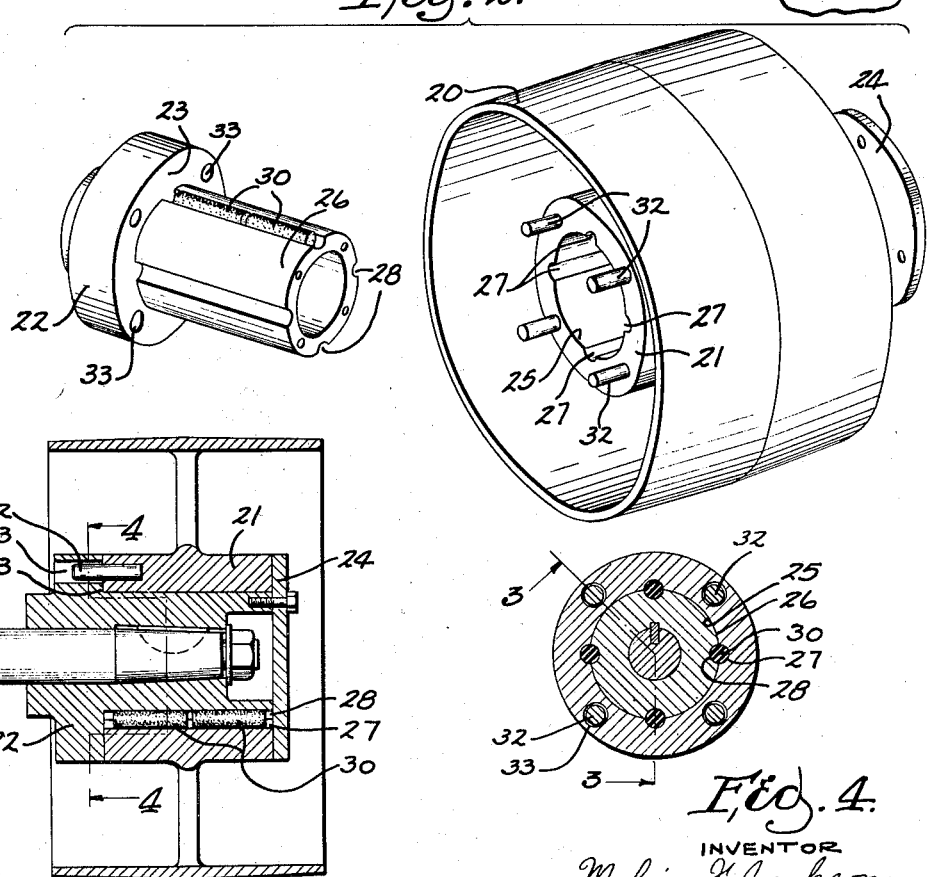
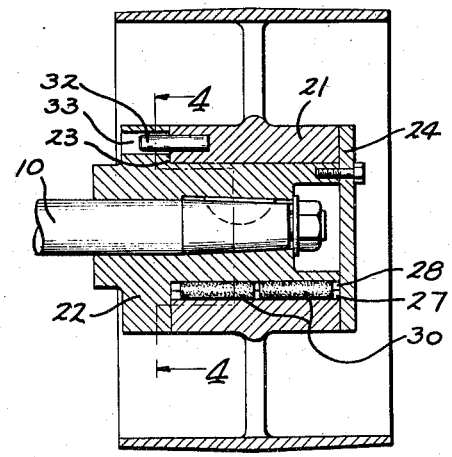
INVENTOR
Melvin F Jackson
BY
Emerson B Donnell
ATTORNEY Patented Apr. 25, 1950

2,505,120

UNITED STATES PATENT OFFICE 2,505,120

VIBRATION DAMPING DEVICE

Melvin F. Jackson, Racine, Wis., assignor to J. I. Case Company, Racine, Wis., a corporation of Wisconsin Application January 15, 1945, Serial No. 572,845

10 Claims. (Cl. 74—409)

This invention relates to improvements in vibration-damping tractor drives.

It is a primary object of the invention to reduce or eliminate tooth chatter in a tractor drive. The drive is one in which the tractor engine transmits its power to a cross shaft upon which the change speed gearing is located.

In a system of this character, a substantial mass in the form of a flywheel is coupled directly to a driving gear through the usual friction clutch. Also in the cross shaft there is a substantial mass in the form of the fixed change speed gears. A belt pulley is commonly fixed with this cross shaft and a driven gear on the shaft is meshed with the above mentioned driving gear, the usual backlash being present. All of the parts are made of highly resilient material and the possibility exists of repeated impact loads on the teeth of these gears due to a vibration of one or the other shaft to the extent of the backlash plus a torsional or other springing of the connected gears and shafts. The mass on one shaft acts as a base or anvil for the impacts delivered by the mass on the other shaft. This vibration may build up sufficiently to cause a disagreeable noise and possibly to impose excessive loads on the gears or the shafts or both.

Obviously, it is undesirable to unnecessarily load the parts in this manner, and accordingly a further object of the invention is to reduce or eliminate such vibration and with it such unnecessary loads. The action is most likely to occur at light loads. In fact, under heavy loads, which definitely eliminate the backlash, the chatter does not occur.

According to the present invention, a pulley is so mounted on the driven cross shaft as to have a limited amount of torsional movement with respect to the shaft, such movement being utilized to establish forces for damping the vibration of the shaft. The nature and objectives of the invention will appear more particularly from the following disclosure thereof.

In the drawings:

Fig. 1 is a diagrammatic plan view of a tractor drive embodying the invention.

Fig. 2 is an enlarged detailed view showing in perspective the separate component parts of my improved vibration damping pulley.

Fig. 3 is a detailed view of the pulley in longitudinal section taken on line 3—3 of Fig. 4.

Fig. 4 is a view taken in transverse section on the line 4—4 of Fig. 3.

Like parts are identified by the same reference characters throughout the several views.

The tractor prime mover 5, usually comprising an internal combustion engine, has a fly wheel 5a driving, through a clutch 5b, a drive shaft 6 subject to the torque vibration developed in the engine and fly wheel. Shaft 6 is provided with a bevel gear at 7 driving the mating gear 9 on the cross shaft 10. The cross shaft is provided with driving gears with which driven gear elements splined to cross shaft 11 may be selectively meshed. The pinion portion 12 on cross shaft 11 drives the differential gear set 13 which couples shafts 14 and 15 differentially. Chains or the like at 16, 17 connect the respective shafts 14, 15 with rear axle shafts 18, 19 to operate the wheels.

The pulley at the end of cross shaft 10 is a combination power takeoff and vibration-damping device. The pulley is connected to an outer hub element 21 which is rotatably sleeved upon an inner hub element 22 keyed to the shaft 10. Hub element 22 has a shoulder at 23 against which hub element 21 is held by thrust disk 24 bolted to hub element 22. Thus hub element 21 is constrained against axial or universal movement of any kind and is permitted only rotative or torsional displacement with respect to hub element 22 and shaft 10.

Relative rotation of pulley 20 and hub element 21 respecting the inner hub element 22 and shaft 10 is limited in two ways, one of which is impositive and the other positive. The cylindrical bearing surface 25 of the outer hub element 21 and the complementary cylindrical bearing surface 26 of the inner hub element 22 have registering, axially extending channels 27, 28 in which are disposed small dowel-shaped elastic keys 30 which yieldably transit motion between the inner and outer hub elements. The relative yielding between such elements is positively limited by the driving pins 32 which project axially from the outer hub element 21 into the sockets 33 bored into or through the shouldered base 23 of the inner hub element 22. Obviously, the pins may be in either the outer or inner hub element and the sockets therefore in the other. The elastic keys at 32 keep the respective pins yieldably centered in the respective sockets. The resistance to displacement is determined in part by the relative hardness of the elastic material of which the keys are made. This will ordinarily be natural or artificial rubber of any suitable hardness. The range of relative circumferential movement between the inner and outer hub elements is determined by the circumferential clearance between the driving pins and their respective sockets and should be greater than the amplitude of the forced vibration as measured at the socket.

Advantage is taken of the well known property of internal friction common to rubber and rubber-like materials for absorbing energy so as to cut down or inhibit, instead of to enhance or build up the rapid alternate twisting distortion common to highly resilient machine parts. The disclosed arrangement is characterized by a pair of substantial rotative masses connected to each other by a system of highly resilient shafts involving a lost motion connection. While the action is perhaps not completely understood, observations indicate that such systems can be set into substantial torsional vibration by any variations in rate of driving of one mass, such for example as the well known cyclic fluctuations in speed of an internal combustion engine, provided that the load is light enough so that the driven member may overrun the driving member during the low speed periods thereof to the extent of the lost motion. At the conclusion of the overrun an impact results which, due to the resilient character of the parts and the inertia of the driven mass, causes a rebound in a direction opposed to the rotation. While the driven member does not actually reverse its rotation, it does lag behind the driver to the extent of the lost motion, whereupon another impact results, this time on the driving side of the lost motion. This action may repeat itself several times during each acceleration cycle of the driver, which in common types of engines occurs twice during each revolution of the crank shaft.

The invention in its broader aspects comprises the introduction into a system of this character of an energy absorbing unit or substance to dissipate some of the energy present in the rebound or vibratory motion of the parts. The amount of energy involved is very slight, but the forces developed, owing to the inertia and impact effects, can be very large and the novel interposition of the simple energy absorbing unit or device between the lost motion connection—in this instance, the backlash in the gears—and one of the masses, results in a virtually complete elimination of the chattering effect.

With this device in use upon the cross shaft 10, the pulley, instead of amplifying the torque vibration in shaft 10, or increasing the impact exerted on the gear teeth as a result of such vibration, tends to damp the vibration, being particularly effective as a damping agent when the load is light. Whenever the pulley 20 is in use, the resistance or load to which its periphery is subjected will almost immediately overcome the resiliency of the yieldable driving keys 30 and the torque will be transmitted through the positive driving connection afforded by the pins 32. As previously indicated, there is little or no torque vibration in shaft 10 when the shaft is under load. Consequently, the driving pulley functions for non-yielding motion transmission under load when its damping effect is not required, but performs its damping function at all other times.

I claim:

1. In a tractor drive, the combination with a prime mover having a drive shaft subject to torque vibration, of a driven shaft, gears operatively connecting said shafts, and means on the driven shaft for relieving said gears of vibration chatter, said means comprising a pulley on said driven shaft spaced from said gears and having inner and outer hub sections, one of said sections being fast to the shaft and the other to the pulley, said sections having respective mountings for limited relative oscillation between said sections, and elastically yieldable driving means resisting such oscillation.

2. The combination set forth in claim 1 in which the respective hub sections of the pulley are provided with positive driving connections affording a limited degree of lost motion within which the elastically yieldable driving means is effective.

3. The combination set forth in claim 1 in which one of said sections is apertured and the other provided with a pin loosely fitted to said aperture to provide a positive driving connection between said sections, the loose fitting of the pin in the aperture providing a limited lost motion between said sections within which said elastic driving means is effective.

4. In a tractor drive, the combination with an internal combustion engine having a drive shaft subject to torque vibration, of a first cross shaft, a second cross shaft, driving gearing between the cross shafts, driving gearing from the engine shaft to the first cross shaft, and a tractor propelling drive from the second cross shaft, together with a pulley having means mounting it upon said first cross shaft in spaced relation to the second mentioned driving gearing, said means comprising a vibration damper including means for permitting a limited relative movement between the pulley and the first cross shaft, and elastically yieldable means resiliently opposing such relative movement.

5. In a tractor drive comprising an engine having a driving shaft, a gear on the driving shaft, a driven gear meshing with the first mentioned gear, and a driven shaft connected with the driven gear, the combination with such driven shaft of a combination pulley and vibration damper in spaced relation to said gears for relieving said gears of vibration chatter, and comprising a driving hub element to which the driven shaft is connected, a driven hub element to which the pulley is connected, said hub elements having mating bearing means for accommodating oscillation between said elements, and elastically yieldable means opposing such oscillation.

6. The combination set forth in claim 5 in further combination with means for positively limiting the extent of oscillation between said elements.

7. The device of claim 5 in which the resiliently yieldable means opposing relative oscillation between said elements comprises a rubber key operatively engaged between said elements.

8. The device of claim 5 in which the resiliently yieldable means opposing relative oscillation between said elements comprises a rubber key operatively engaged between said elements, the respective elements being provided with mutually engageable, positively acting stop means limiting the amplitude of relative oscillation therebetween.

9. In a tractor drive the combination with a prime mover having a drive shaft subject to torque vibration, of a driven shaft, gears operatively connecting said shafts and subject to backlash, a rotatable mass on each shaft of a character such that a natural vibration frequency of one shaft may substantially correspond with that of the other whereby rebound and consequent vibration chatter may develop between the teeth of the gearing to the extent of the limits defined by said backlash, means on the driven shaft for relieving said gears of said vibration chatter, said means comprising a rotatable mass on said driven shaft spaced from said gears and having at least two independent sections, one of said sections being fast to the shaft and the other free to rotate relatively thereto, said sections being connected for limited relative oscillation, and an energy absorbing elastic connection between said sections yieldably resisting such oscillation for absorbing from oscillatory vibrations of said shaft enough energy to damp said vibrations.

10. In a tractor drive the combination with a prime mover having a drive shaft subject to torque vibration, of a driven shaft, gears operatively connecting said shafts and subject to backlash, a rotatable mass on each shaft of a character such that a natural vibration frequency of one shaft may substantially correspond with that of the other whereby rebound and consequent vibration chatter may develop between the teeth of the gearing to the extent of the limits defined by said backlash, means on the driven shaft for relieving said gears of said vibration chatter, said means comprising a rotatable mass on said driven shaft spaced from said gears and having at least two independent sections, one of said sections being fast to the shaft and the other free to rotate relatively thereto, said sections being connected for limited relative oscillation, and an elastic connection between said sections yieldably resisting such oscillation for so modifying the vibration characteristics of said driven shaft as to substantially prevent such correspondence of frequency and to avoid rebound between said gear teeth.

MELVIN F. JACKSON.

REFERENCES CITED

The following references are of record in the file of this patent:

UNITED STATES PATENTS

| Number | Name | Date |
|---|---|---|
| 380,454 | Morgan | Apr. 3, 1888 |
| 1,585,141 | Foote | May 18, 1926 |
| 2,158,244 | Mistretta et al. | May 16, 1939 |
| 2,214,921 | Criswell | Sept. 17, 1940 |
| 2,297,005 | Livingston | Sept. 29, 1942 |

FOREIGN PATENTS

| Number | Country | Date |
|---|---|---|
| 6,429 | Great Britain | 1904 |
| 26,488 | Great Britain | 1907 |